(12) United States Patent
Purnadi et al.

(10) Patent No.: US 7,697,471 B2
(45) Date of Patent: Apr. 13, 2010

(54) ADDRESS TRANSLATION IN A COMMUNICATION SYSTEM

(75) Inventors: Rene Purnadi, Coppell, TX (US); Franck Le, Pittsburgh, PA (US)

(73) Assignee: Nokia Corporation, Espoo (FI)

( * ) Notice: Subject to any disclaimer, the term of this patent is extended or adjusted under 35 U.S.C. 154(b) by 1021 days.

(21) Appl. No.: 11/412,515

(22) Filed: Apr. 27, 2006

(65) Prior Publication Data

US 2007/0253417 A1 Nov. 1, 2007

(51) Int. Cl.
*H04W 4/00* (2009.01)
*H04L 12/28* (2006.01)
(52) U.S. Cl. ....................... 370/328; 370/401
(58) Field of Classification Search ........... 370/328, 370/392, 393, 401; 709/228
See application file for complete search history.

(56) References Cited

U.S. PATENT DOCUMENTS

| 2002/0124090 | A1* | 9/2002 | Poier et al. ............. 709/228 |
| 2005/0050211 | A1* | 3/2005 | Kaul et al. ............. 709/229 |
| 2005/0283536 | A1* | 12/2005 | Swanson et al. ........ 709/232 |
| 2007/0076729 | A1* | 4/2007 | Takeda ................. 370/401 |
| 2007/0153812 | A1* | 7/2007 | Kemp .................. 370/401 |

OTHER PUBLICATIONS

Sen et al., Midcom Working Group, Internet Draft, Category: Standards Track, Expires on Oct. 2002, "Midcom Unaware NAT/Firewall Traversal," Apr. 2002, p. 1-15.
Rosenberg et al., Internet Engineering Task Force, Internet Draft, Draft-Rosenberg-Sip[ping-nat-scenarios-00.txt, Expires Mar. 2002, "NAT and firewall scenarios and solutions for SIP," Nov. 14, 2001, p. 1-56.
Mellouk and Guezouri, A new ,methodology to adapt SIP protocol for voice traffic transported over IP network. Proceedings of the Advanded International Conference on Telecommunications anmd National Conference on Internet and Web Applications and Services (AICT/ICIW 2006), Feb. 19, 2006, XP010898448.
Rosenberg et al., "Stun-Simple traversal of user datagram protocol (UDP) through network address translators (NATs): rfc3489.txt;" IETF Standard, Internet Engineering Task Force, IETF, CH, Mar. 2003, XP015009272.
International Search report for PCT Application No. PCT/IB2007/002667.

* cited by examiner

*Primary Examiner*—Hong Cho
*Assistant Examiner*—Saba Tsegaye
(74) *Attorney, Agent, or Firm*—Foley & Lardner LLP

(57) ABSTRACT

A controller for a communications system comprises an input and an output for communicating with nodes connected to the communications system. The controller is provided with a processor for determining presence of an address translator entity between a first node and a second node. The controller is further configured for generating an indication of the presence of the translator entity for sending to another node.

16 Claims, 3 Drawing Sheets

ADDRESS TRANSLATION IN A COMMUNICATION SYSTEM

FIELD OF THE INVENTION

The present invention relates to data communication sessions in a communication system and in particular, but not exclusively, to multimedia sessions in arrangements where an address translator node is located between a user device and another node.

BACKGROUND OF THE INVENTION

A communication system can be seen as a facility that enables communication sessions between two or more entities such as user equipment or other nodes associated with the communication system. The communication may comprise, for example, communication of voice, multimedia content, and other data. A session may, for example, be a telephone call type session between two users, a multi-party session, for example a conference call, or a data communication session between at least one user and a node such as an application server (AS).

A communication system typically operates in accordance with given standards and/or specifications, which set out what the various entities associated with the communication system are permitted to do and how that should be achieved. For example, a standard or specification may define if the user, or more precisely, user equipment is provided with a circuit switched service and/or a packet switched service. Communication protocols and/or parameters, which shall be used for the connection may also be defined. In other words, a specific set of rules on which the communication can be based is defined to enable communication. A communication system may provide fixed or wireless access for the user equipment. A communication system may include various entities for controlling and/or carrying communications between two or more communicating parties. Different control entities may be interconnected. One or more gateway nodes may be provided for connecting various networks, for example for connecting a public switched telephone network (PSTN), a public landline mobile network (PLMN), a local area network (LAN), a wireless LAN (WLAN) and/or other communication networks such as an IP (Internet Protocol) and/or other packet switched data networks to each other. A communications network the user is connected to is understood as providing an access system enabling a user to access other networks, hosts, or services offered by specific service providers.

In a packet data network, a packet data carrier may be established to carry traffic flows consisting of data packets over the network. Each data packet is provided with appropriate routing information, such as destination address and port information so that the various entities in the route to the destination know where the data packet shall be forwarded.

Various types of services can be provided to the users of a communications system. A type of possible services is commonly referred to as multimedia. An example of multimedia services is where multimedia content, such as images, videos, audio files or other data, may be downloaded from an application server to a user equipment. Users may also send data to other entities via a communication system. For example, a user may create something, such as take a photo or make a video, and send his creation in a digitized form, i.e. as content data to a multimedia server. The work may then be downloaded from the server by other parties interested of the same subject. Data communications for enabling communication of multimedia may be provided by an appropriate data communications system, for example an Internet Protocol Multimedia system.

A multimedia data communication system may comprise an addresses translator node, for example a network address translator (NAT). Use of an address translator results a situation where a pair of a private Internet Protocol (IP) address and a port that belongs to an internal node behind an address translator node translates to a different pair of a public IP address and a port.

In an IP multimedia session (IMS) the IP address and port used for sending and receiving a media packet is usually different than the IP address and port used to send and receive the signalling traffic. The presence of the address translator node therefore may cause certain problems for a node that is located behind the address translator node. For example, because of the intermediate address translator node such a node may not know the translation of private and public IP address and port pairs for incoming media traffic in advance, for example before it sends a media packet through the address translator node.

An element known as the media proxy may also be provided in a multimedia system. The function of a media proxy is to force the media traffic between parties, e.g. a user and an application server, to traverse through it to provide the network operator with a better control on the media traffic. The media proxy reserves a pair of public IP address and port to be used by a node for the media traffic, and maps this pair of reserved public IP address and port to the IP address and port of the node.

The presence of a media proxy may complicate the already complicated situation caused by an address translator node even further. If one of the parties is behind an address translator node, the media proxy must map the public IP address and port of the party to the reserved IP address and port. The presence of an address translator node would require the media proxy to map the translated IP address and port for media packets instead of the private IP address and port of the party to the reserved IP address and port reserved by the media proxy. However, this translated IP address and port is not available in the media proxy at the time of IP address and port reservation.

On the other hand, if no address translator node is present, the media proxy can instantly map the IP address and port of the node to the IP address and port reserved by the media proxy. In other words, the presence of an address translator node necessarily affects the behavior of a media proxy.

A problem is the lack of a proper mechanism to inform and/or control the media proxy in this regard, and it is the aim of the embodiments of the present invention to address or at least mitigate this and other problems caused by the presence of an address translator.

SUMMARY OF THE INVENTION

In accordance with an embodiment, there is provided a controller for a communications system. The controller comprises an input and an output for communicating with nodes connected to the communications system. It is further provided with a processor for determining presence of an address translator entity between a first node and a second node. The processor is configured for generating an indication of the presence of the translator entity for sending to another node.

In accordance with another embodiment, there is provided a mapping entity for a communications system. The mapping entity comprises an input and an output for communicating data with nodes connected to the communications system, and a processor configured for mapping routing parameters to reserved parameters by taking into account information from a controller indicative of presence of an address translator entity between the controller and another.

In accordance with an embodiment, there is provided a method for mapping addresses in a communications system, the method comprising receiving a data packet containing control protocol in a controller, determining if an address translator entity is present between the controller and the source of the data packet, informing at least one other node of the presence of an address translator entity in response to determination that the address translator entity is present, receiving in a node information that the address translator entity is present, and postponing mapping of routing parameters at the node in response to receiving said information.

In accordance with a more detailed embodiment, the controller is configured to include an indication into a message to provide a node associated with a multimedia service with information regarding the presence of the address translator entity. The controller may include the indication in a resource request message.

The mapping entity may be configured to postpone the mapping of routing parameters in response to an indication that an address translator entity is present. The mapping entity may be configured to postpone the mapping until address translator translated routing parameters are available. The mapping may be postponed until a packet containing media traffic is received from a node behind the address translator entity by the mapping entity. The mapping entity may comprise a media proxy.

The embodiments of the invention may provide a mechanism for informing a node performing address mapping whether another node is behind an address translator to allow the mapping node to perform appropriate IP address and port mapping.

BRIEF DESCRIPTION OF THE DRAWINGS

For a better understanding of the present invention and how the same may be carried into effect, reference will now be made by way of example only to the accompanying drawings in which.

DETAILED DESCRIPTION OF EMBODIMENTS OF THE PRESENT INVENTION

To assist in understanding the invention, an explanation of a possible underlying communication system is given first with reference to a communication system wherein user access can be provided via a wireless local area network (WLAN). In such architecture a backbone communication network provides user equipment with access to multimedia services via a localised network. A multimedia system typically includes various network entities for the provision of the multimedia services. The multimedia services are intended to offer, inter alia, IP based packet data communication sessions for user equipments.

A wireless access system such as the wireless local area network (WLAN) can be arranged to serve mobile user devices via a wireless interface between the user device and one or a plurality of base stations to provide access to a communication network covering a wider area. The mobile user device will be referred to below as mobile stations, where appropriate.

Figure 1:
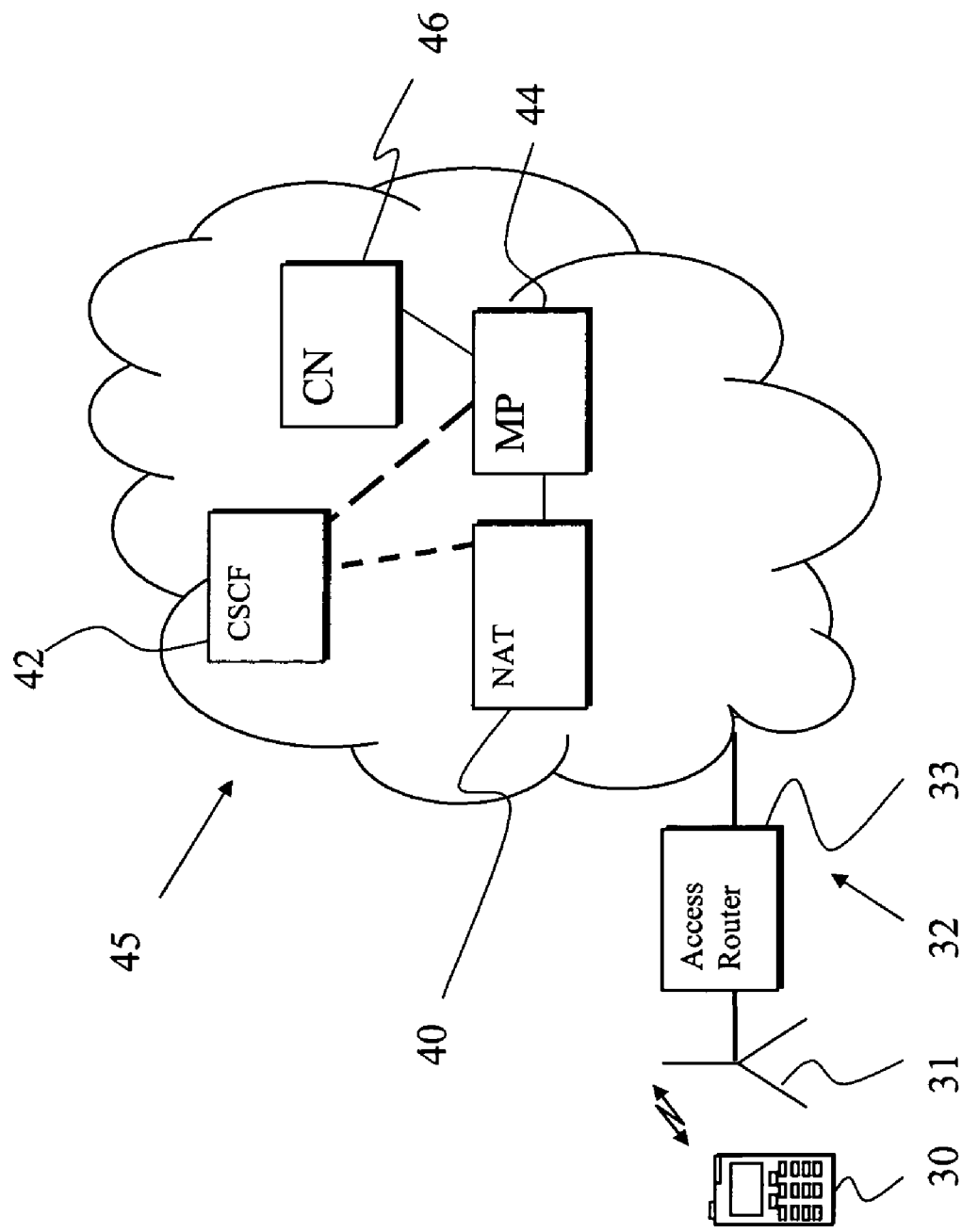
FIG. 1 shows a schematic view of a communications network wherein the present invention may be embodied.

In FIG. 1, the intermediate network provides packet switched data transmission in the packet switched domain for a mobile station 30. The intermediate network is in turn connected to an external data network, for example to a packet switched data network (PSDN) 45 such as the Internet via an appropriate gateway arrangement, such as an access router 33. The base station 31 of the local wireless access system is arranged to transmit signals to and receive signals from the mobile station 30 via a wireless interface. Correspondingly, the mobile station 30 is able to wirelessly transmit signals to and receive signals from the base station. It should be appreciated that, although FIG. 1 only shows a base station of a radio access network, a communication system may include a number of local access systems. A number of mobile devices may be in simultaneous communication via the one or more access systems.

The mobile station 30 may access various services, including services offered by the data network 45 via a wireless connection. The mobile station 30 may thus be used for tasks such as making and receiving phone calls, for receiving and sending data from and to a network and for experiencing multimedia content. Any appropriate mobile station equipment adapted for communication based on an appropriate protocol, for example the internet protocol (IP), may be used to connect to the network. For example, a user may access the cellular network by means of user equipment such as a personal computer, personal data assistant (PDA), mobile station (MS), portable computer, combinations thereof or the like.

A mobile station is typically provided with a processor and memory for accomplishing the required tasks. A user device such as the mobile station 30 may include an antenna for wirelessly receiving and transmitting signals from and to base stations of the mobile communication network. A user device may also be provided with a display for displaying images and other graphical information for the user thereof. A speaker may also be provided. The operation of the user device may be controlled by means of a suitable user interface such as key pad, voice commands, touch sensitive screen or pad, combinations thereof or the like.

Services can be provided for users by means of various functions on control and user planes. From these the control plane functions are understood as relating to support operations such as signalling whereas user plane operations relate to communication of the actual payload data. In FIG. 1 control plane communications associated with the multimedia services are show by the dashed lines and user plane connections are shown by the solid lines. Principal differences in the user and control plane communications are explained below.

The network entities providing the control plane functions, such as signalling, may comprise servers. In a possible multimedia network architecture several different servers can be employed for handling different control plane functions. A control server may be provided by an IP Multimedia Session (IMS) control server, such as a Session Initiation Protocol application level gateway (SIP ALG), call server control function (P-CSCF), or the like. The call server control functions can be divided into various categories such as a proxy call server control function (P-CSCF), interrogating call server control function (I-CSCF) and serving call server control function (S-CSCF). In FIG. 1 the required control plane functions are understood to be provided by a control server 42, although it shall be understood that a number of servers might be involved.

A media proxy 44 in turn is understood as being located on the user plane of the multimedia network 45. In accordance with an embodiment, the media proxy 44 reserves an IP address and port pair upon a request from the control server 42.

FIG. 1 shows further an address translator node 40. The control server 42 can determine if a destination node, such as the mobile user equipment 30, is behind the address translator node 40 or not. The control server may determine this information, for example, by checking the source IP address and port in the header of the received packets against the IP address and port in the via header of the session initiation protocol message in the payload of the received packets.

A function of the control server is to manage the IM service, and therefore only packets containing some control protocol (e.g. SIP) signalling go through the control servers. Any media traffic that is communicated on the user plane does not need to traverse the control servers, but only traverses servers such as address translators and media proxies, and any intermediate routers there might be.

A correspondent node 46 is also shown. Communication between the correspondent node and the mobile device 30 occurs on the user plane.

In an embodiment a new indication is included in an appropriate message to provide information to a recipient of the message that a node is behind an address translator node. A specific example of this indication and how it can be carried comprises a new attribute added to a resource request message from the control server 42 to the media proxy 44. A specific example of this will be explained later in more detail with reference to FIG. 3.

Figure 2:
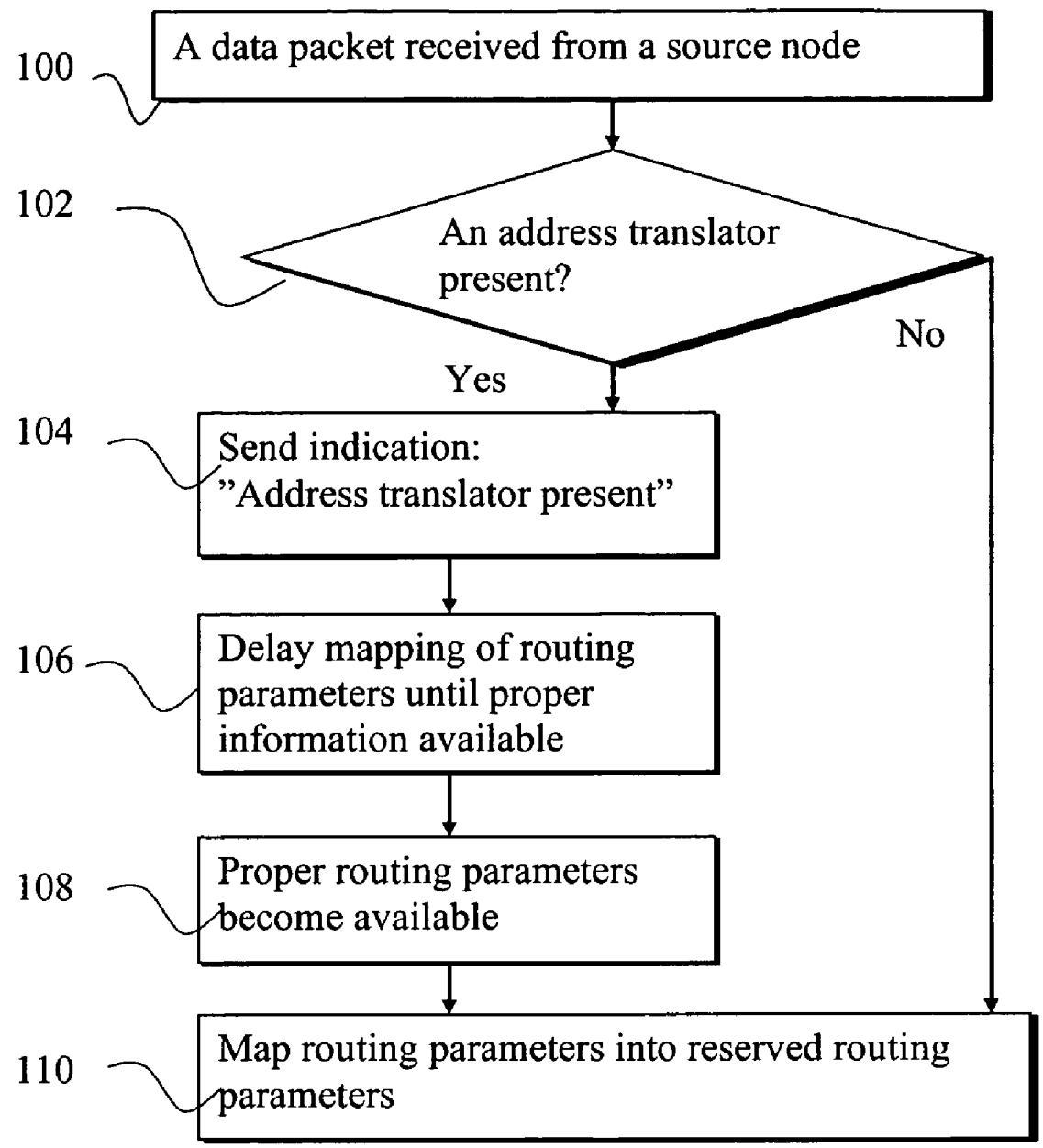
FIG. 2 shows a flowchart in accordance with an embodiment.

FIG. 2 shows a flowchart for an embodiment. A data packet containing control protocol message, for example a session initiation protocol message, is received from a source node in a controller node at step 100. The controller node may then determine at step 102 if an address translator entity is present between the controller node and the source node. If it found that an address translator entity is present, the controller node sends information to at least one other node of the presence of the translator entity at step 104.

If a recipient node, for example a media proxy or another user plane node associated with the multimedia service, is informed by the indication that the target node is behind an address translator entity, the recipient node can postpone mapping of media traffic routing parameters at step 106. The postponement is preferably applied until the appropriate routing parameters, for example proper address and port information, become available at 108. The mapping may be postponed, for example, until the target node sends first outgoing media packet. The delay in the mapping can be advantageous since the IP address and port included in the resource request message is not the IP address and port provided by the address translator node but the private IP address and port of the node that is behind the address translator entity.

In the absence of an indication that the target node is behind an address translator entity, the media proxy node can instantly map at step 110 the routing parameters, for example an IP address and port, given in the resource request message to the reserved routing parameters.

Figure 3:
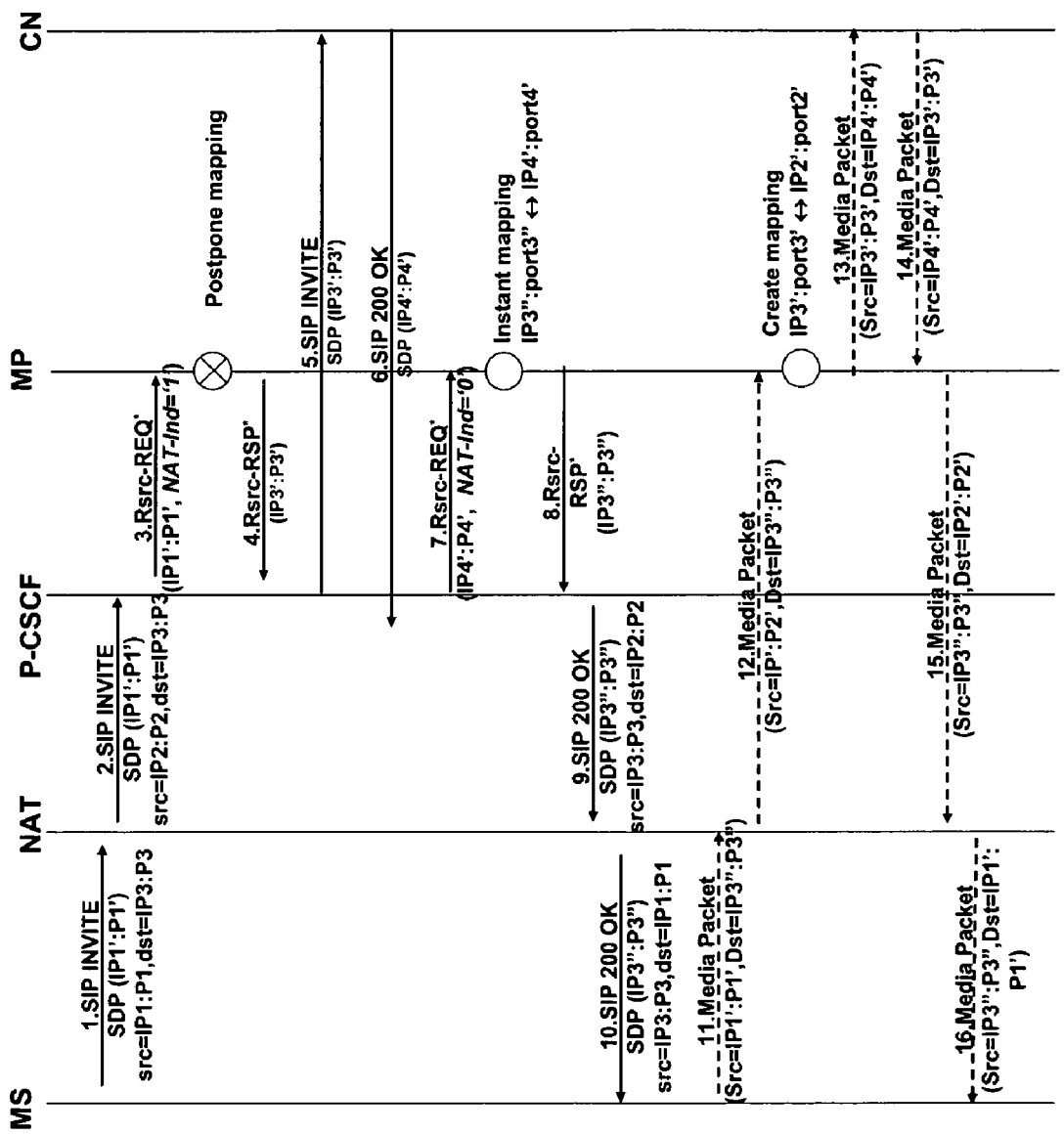
FIG. 3 a message flow diagram for a specific embodiment.

An exemplifying message sequence chart in accordance with a possible specific embodiment is shown in FIG. 3. In the illustrated signalling flow Session Initiation Protocol (SIP) messaging is used for the signalling in an IMS domain. The IMS domain commonly supports the session initiation protocol (SIP) as developed by the internet engineering task force (IETF). The session initiation protocol (SIP) is an application-layer control protocol for creating, modifying and terminating sessions with one or more participants (end point). SIP was generally developed to allow for the initiation of a session between two or more end points in the Internet by making these end points aware of the session semantics. A user connected to a SIP enabled communication system may communicate with various entities of the communication system based on standardised SIP messages. User equipment or users that run certain applications on the user equipment are registered with the SIP backbone so that an invitation to a particular session can be correctly delivered to these end points. SIP provides a registration mechanism for devices and users and it applies mechanisms such as location servers and registrars to route the session invitations appropriately. Examples of proper possible sessions that may be provided by SIP signalling include internet multimedia conferences, internet telephone calls and multimedia distribution.

The multimedia session setup of the example of FIG. 3 uses the SIP messages to address a situation where a mobile user device such as a mobile station (MS) is located behind a network address translator (NAT). In FIG. 3 a proxy control server (P-CSCF) requests resources from a media proxy (MP) upon receiving both the SIP outbound signalling from the mobile station (MS) and SIP inbound signalling from a correspondent node (CN).

As explained above, communication between the correspondent node (CN) and the mobile station (MS) occurs on the user plane. It is noted that the 'NAT-ind=' attribute of the messages 3 and 7 of FIG. 3 is only an example of a message that can be used to carry the indication regardless whether the mobile user device is behind a NAT or not. This attribute may be included in a resource request message sent by the control server to the media proxy.

More particularly, in FIG. 3 a mobile station (MS) sends first a SIP 'INVITE' message 1 to a proxy server, which in this specific example is provided by a P-CSCF. The mobile station may have IP1:port1 as the source IP and port. The P-CSCF may have IP3:port3 as the destination IP and port for the packet containing the SIP INVITE. The SIP INVITE message 1 may include the IP1':port1' parameter in the session description protocol (SDP) where the mobile station expects to receive media from the session.

The SIP 'INVITE' message then passes a symmetric network address translator (NAT) node. At this stage the symmetric NAT maps the source IP1:port1 into IP2:port2, i.e. the assigned IP:port for packet from IP1:port1 to IP3:port3, and forwards the packet to IP3:port3, i.e. to the P-CSCF, in message 2. This mapping may occur during the SIP registration procedure where the mobile station sends data packet(s) to similar destination (P-CSCF) and this address translation should remain valid.

The P-CSCF is then able to detect that the mobile station (MS) is behind a NAT by comparing the source IP:port in the header of the received packet and the IP address and port in the Via field of the SIP INVITE message. The P-CSCF then requests a resource from the media proxy (MP), inserting an indication to the request 3 that the mobile station (MS) is behind a NAT. It may also include the IP1':port1', i.e. the IP:port in the original SDP, in the request message 3.

The 'behind NAT' indication is a new attribute. Since the multimedia proxy defers the mapping until it receives the first packet from the mobile station, the mobile station should set its SDP with 'active' role, for example by using SIP comedia extension, so that it will immediately send a packet upon receiving a SIP '200 OK' response message from the correspondent node (CN).

The media proxy (MP) may then assign IP3':port3' dedicated for inbound traffic for the mobile station and send this transport address (IP3':port3') to the P-CSCF in message 4. Since the P-CSCF can indicate that the mobile station is behind a NAT, the MP defers the mapping until it receives the first outbound packet from the mobile station. In a typical use scenario the MP should not use the IP address and port in the resource request message that comes from the SDP (IP1':port1') to be mapped to the IP3':P3' at this moment. If the mobile station is not behind a NAT, the MP can instantly create a mapping between the IP3':P3' and IP1':port1'.

The P-CSCF may then forward the SIP INVITE message to the correspondent node (CN), see message 5. The P-CSCF may modify the SDP from IP1':port1' into IP3':port3'. Upon receiving the SIP INVITE, and if the CN is willing to accept the session, it will reply with SIP 200 OK message 6 to the P-CSCF. The 'SIP 200 OK' may include the IP4':port4' in the SDP where the CN expects to receive the media traffic from the session.

Upon receiving the SIP 200 OK, the P-CSCF then request a resource from the MP by message 7. The proxy can include an indication into message 7 that the CN is not behind a NAT. It can also include the IP4':port4', i.e. the original IP:port in the SDP inside message 6, in the request.

The MP then assigns IP3":port3" dedicated for outbound traffic for the mobile station and sends this allocated transport address (IP3":port3") to the P-CSCF in message 8. The MP is configured to relate the IP3':port3' and the IP3":port3". Since the P-CSCF has indicated that the CN is not behind a NAT, the MP can instantly map the IP3":P3" to IP4':port4'.

The P-CSCF may then forward the SIP 200 OK message 9 to the mobile station with SDP equals to IP3":port3" instead of the original IP4':port4'. Since the P-CSCF knows that the mobile station is behind a NAT, it may send the packet containing the SIP 200 OK with destination IP2:port2 in the IP header, i.e. the mapping for signalling traffic in the NAT.

The NAT can now translate IP2:port2 to IP1:port1 and forward the packet containing SIP 200 OK to the mobile station in message 10.

The mobile station that has been set to 'active' role, e.g. by using SIP comedia extension, may immediately send its first outbound packet in message 11 using its IP address and port for the media traffic (IP1':port1') with destination IP3":port3". When this outbound packet traverse through the NAT, the NAT will translate the source IP1' and port1' and destination IP3" and port3" into source IP2' and port2' and forward the packet to IP3":port3" in message 12. Upon receiving this first packet, the MP can authenticate this first packet and if the authentication is successful, the MP will create a new mapping of the IP3":port3" to IP2':port2'. The MP should now have outbound mapping of source=IP2':port2' destination=IP3":port3" to source=IP3':port3' destination=IP4':port4' and inbound mapping of source=IP4':port4' destination=IP3':port3' to source=IP3":port3" destination=IP2':port2'.

The MP may forward in message 15 the outbound packet (source=IP2':port2' destination=IP3":port3") with new transport addresses (source=IP3':port3' destination=IP4':port4') based on the inbound message 12. The CN can send inbound packet in message 14 with source=IP4':port4' destination=IP3':port3' according to the transport address in the SDP. When the MP receives inbound packages from IP4':port4' to IP3':port3', the MP will forward the packet with source=IP3":port3" destination=IP2':port2' based on the inbound mapping in message 12. It is noted that IP2':port2' above are the NAT-translated IP address and port number of the mobile station, the translation being from a private IP address and port to a public IP address and port.

The NAT may forward inbound packets with source=IP3":port3" destination=IP1':port1' in message 16 and deliver the packet to the mobile station based on the translation in the NAT.

A possible implementation is to put a 'special' IP address and port in a resource request message, for example in a resource request from an IMS control server to a media proxy, instead of the IP address and port included in the SDP in the above example, after the IMS control server becomes aware that the node is behind a NAT. This special IP address and port can serve as an indication that the node is behind a NAT. The latter option may be less robust compared to the use of a new attribute that indicates whether the node is behind a NAT or not, but can be used e.g. in application where new attributes are not desired.

The embodiments may allow a media proxy node or similar node to become aware whether a target node is behind a an address translator node or not, so that the proxy node can properly create the mapping between the proxy's reserved IP address and port and the target node's translated IP address and port, or the target node's own IP address and port. In the absence of this information, the proxy may map the reserved IP address and port pair to the private IP address and port pair of the node that is provided otherwise, for example included in the resource request message from the IMS control server to the proxy.

The required data processing functions may be provided by means of one or more data processor entities. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

It is understood that although the certain embodiments have been described above with reference to the exemplifying architecture of a third generation (3G) mobile communication system, the embodiments may be applied to any other suitable forms of communication systems than the one illustrated and described herein.

It is also noted herein that while the above describes exemplifying embodiments of the invention, there are several variations and modifications which may be made to the disclosed solution without departing from the scope of the present invention as defined in the appended claims.

The invention claimed is:

1. An apparatus, comprising:
   at least one processor;
   and at least one memory including computer program code;
   the at least one memory and the computer program code configured to, with the at least one processor, cause the apparatus to:
     map routing parameters to reserved parameters by taking into account information from a controller indicative of presence of an address translator entity between the controller and another node; and
     postpone the mapping of routing parameters in response to an indication that an address translator entity is present until a data packet containing media traffic is received from the another node behind the address translator entity.

2. The apparatus as claimed in claim 1, wherein the routing information comprises address and port information.

3. The apparatus as claimed in claim 1, wherein the mapping entity comprises a media proxy.

4. The apparatus as claimed in claim 1, wherein the apparatus is contained in a mapping entity.

5. The apparatus as claimed in claim 1, wherein the indication is included in a resource request message.

6. A method comprising:
mapping of routing parameters by a mapping entity; and
postponing the mapping of routing parameters in response to received information comprising an indication that a determination has been made that an address translator entity is present between a controller and a source of a data packet received containing control protocol; wherein
the mapping of routing parameters is postponed until a data packet containing media traffic is received from the source behind the address translator entity by the mapping entity.

7. The method as claimed in claim 6, wherein the step of informing at least one other node comprises including an indication of the presence of an address translator entity into a message and sending the message to at least one node associated with a multimedia service.

8. The method as claimed in claim 7, wherein the indication is included in a resource request message.

9. The method as claimed in claim 8, wherein the step of determining presence of an address translator entity comprises comparing source IP address and port information in the IP header of the received IP data packet and the IP address and port information in the body of the payload of the received IP data packet.

10. The method as claimed in claim 6, wherein the step of determining presence of an address translator entity comprises comparing source protocol address and port information in a header of the data packet and address and port information in the body of the payload of the received data packet.

11. A computer program product, embodied on a computer readable medium, comprising:
computer code for mapping of routing parameters at a mapping entity; and
computer code for postponing the mapping of routine parameters in response to received information comprising an indication that a determination has been made that an address translator entity is present between a controller and a source of a data packet received containing control protocol; wherein
the mapping of routing parameters is postponed until a data packet containing media traffic is received from the source behind the address translator entity by the mapping entity.

12. A communications system, comprising:
a controller configured for determining presence of an address translator entity between a first node and a second node and for generating an indication; and
a mapping entity configured for mapping routing parameters to reserved parameters such that the indication of the presence of the translator entity from the controller is taken into account, wherein the mapping entity is configured to postpone the mapping in response to indication of the presence of the address translator entity until a packet containing media traffic is received from the first node behind the address translator entity by the mapping entity.

13. The communications system as claimed in claim 12, wherein the controller is configured to determine the presence status of the address translator entity by comparing source protocol address and port information in a header of a received packet and address and port information in the payload of the received packet.

14. The communications system as claimed in claim 12, wherein the controller comprises an Internet multimedia services controller.

15. The communications system as claimed in claim 12, wherein the mapping entity is configured to postpone the mapping of routing parameters in response to an indication that an address translator entity is present.

16. The communications system as claimed in claim 12, wherein the mapping entity comprises a media proxy.

* * * * *